US010248231B2

(12) United States Patent
Tian

(10) Patent No.: US 10,248,231 B2
(45) Date of Patent: Apr. 2, 2019

(54) ELECTRONIC DEVICE WITH FINGERPRINT DETECTION

(71) Applicant: Lenovo (Beijing) Limited, Beijing (CN)

(72) Inventor: Jiangtong Tian, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 11 days.

(21) Appl. No.: 15/087,691

(22) Filed: Mar. 31, 2016

(65) Prior Publication Data

US 2017/0192545 A1     Jul. 6, 2017

(30) Foreign Application Priority Data

Dec. 31, 2015    (CN) .......................... 2015 1 1032525

(51) Int. Cl.
*G06F 3/01*         (2006.01)
*H04M 1/725*     (2006.01)
(Continued)

(52) U.S. Cl.
CPC ............... *G06F 3/041* (2013.01); *G06F 3/02* (2013.01); *G06F 3/038* (2013.01);
(Continued)

(58) Field of Classification Search
CPC ............ G06F 3/041; G06F 3/02; G06F 3/038; G06K 9/00013; G06K 9/00067;
(Continued)

(56) References Cited

U.S. PATENT DOCUMENTS 6,049,621 A * 4/2000 Jain .................... G06K 9/00087
382/125
6,233,348 B1 * 5/2001 Fujii .................. G06K 9/00067
382/125
(Continued)

FOREIGN PATENT DOCUMENTS

CN       101493738 A     7/2009
CN       104679401 A     6/2015
(Continued)

*Primary Examiner* — Sardis F Azongha
(74) *Attorney, Agent, or Firm* — Ference & Associates LLC

(57) ABSTRACT

One embodiment provides a method including detecting an induction region of an electronic device to obtain a first input operation performed by an operation body on press keys of the electronic device, wherein the induction region overlaps with at least a portion of the press keys; collecting and obtaining a first texture information and a second texture information of the operation body within a preset time, and determining a texture information deformation value generated along with the first input operation performed by the operation body based on the first texture information and the second texture information; comparing the texture information deformation value with a preset deformation value to generate a comparison result; and generating and executing a control instruction corresponding to the texture information deformation value based on the comparison result. Other aspects are described and claimed.

20 Claims, 11 Drawing Sheets

(51) Int. Cl.
*H04M 1/67* (2006.01)
*G06K 9/00* (2006.01)
*G06F 3/041* (2006.01)
*G06F 3/02* (2006.01)
*G06F 3/038* (2013.01)
*G06F 3/0482* (2013.01)

(52) U.S. Cl.
CPC .......... *G06K 9/00013* (2013.01); *H04M 1/67* (2013.01); *H04M 1/72519* (2013.01); *G06F 3/0482* (2013.01); *G06F 2203/0338* (2013.01); *G06F 2203/04104* (2013.01); *H04M 2250/22* (2013.01)

(58) Field of Classification Search
CPC ............. G06K 9/00087; G06K 9/0014; G06K 9/0187; G06K 9/0002; G06K 9/001; H04M 1/67; H04M 1/72519
See application file for complete search history.

(56) References Cited

U.S. PATENT DOCUMENTS

| | | | | |
|---|---|---|---|---|
| 8,077,933 B1 * | 12/2011 | Fiske | ...................... | G06K 9/036 340/5.82 |
| 9,195,388 B2 * | 11/2015 | Shepherd | .............. | G06F 3/0482 |
| 9,349,034 B2 * | 5/2016 | Klappert | ............. | G06K 9/00013 |
| 9,390,311 B2 * | 7/2016 | Kuo | .................... | G06K 9/00093 |
| 9,553,859 B2 * | 1/2017 | Slaby | ...................... | H04L 63/08 |
| 9,667,700 B2 * | 5/2017 | Feldman | ................. | H04L 67/10 |
| 2006/0153431 A1 * | 7/2006 | Ando | .................. | G06K 9/00067 382/124 |
| 2012/0306765 A1 * | 12/2012 | Moore | .................... | G06F 3/041 345/173 |
| 2013/0196629 A1 * | 8/2013 | Masuoka | .............. | H04W 12/06 455/411 |
| 2014/0025371 A1 * | 1/2014 | Min | ....................... | G06Q 10/00 704/9 |
| 2014/0085217 A1 * | 3/2014 | Huang | .................. | G06F 3/0487 345/173 |
| 2015/0042576 A1 * | 2/2015 | Wang | ..................... | G06F 3/041 345/173 |
| 2015/0091815 A1 * | 4/2015 | Michaelis | ........... | G06F 3/03545 345/173 |
| 2015/0135108 A1 * | 5/2015 | Pope | .................. | G06K 9/00006 715/767 |

FOREIGN PATENT DOCUMENTS

| | | |
|---|---|---|
| CN | 104932828 A | 9/2015 |
| CN | 105094443 A | 11/2015 |
| CN | 105302373 A | 2/2016 |

* cited by examiner

ELECTRONIC DEVICE WITH FINGERPRINT DETECTION

CLAIM FOR PRIORITY

This application claims priority to Chinese Application No. 201511032525.4, filed on Dec. 31, 2015, which is fully incorporated by reference herein.

FIELD

The subject matter described herein relates to the field of electronic technologies, more specifically, it relates to an information processing method and an electronic device.

BACKGROUND

With the development of science and technology, electronic technologies are developed rapidly, and many electronic devices, such as smart phones and tablet PCs, have become daily necessities for people. For the convenience of user need, the electronic devices are usually provided with multiple press keys for facilitating the rapid operation of the user.

When the user needs to adjust the volume, a volume button on the electronic device must be pressed. When the user needs to lock or unlock the screen, a power button on the electronic device must be pressed. When the user needs to go back to a home interface of a display unit, a Home button must be clicked.

In view of the above, when the user needs to achieve different functionalities, different press keys must be operated, and therefore, these electronic devices have the technical problem that different press keys need to be set to perform different operations and to achieve different functionalities.

BRIEF SUMMARY

In summary, one aspect provides an electronic device, comprising: a processor; a fingerprint module coupled to the processor, wherein the fingerprint module acquires fingerprint information of a user; and a detector module coupled to the processor and the fingerprint module, wherein the detector module detects a change in the fingerprint information as the fingerprint information is being acquired by the fingerprint module.

Another aspect provides an electronic device, comprising: a first acquisition unit, configured to detect an induction region of an electronic device to obtain a first input operation performed by an operation body on press keys of the electronic device, wherein the induction region overlaps with at least a portion of the press keys; a first determination unit, configured to collect and obtain a first texture information and a second texture information of the operation body within a preset time, and determine a texture information deformation value generated along with the first input operation performed by the operation body based on the first texture information and the second texture information; a first comparison unit, configured to compare the texture information deformation value with a preset deformation value to generate a comparison result; and a first execution unit, configured to generate and execute a control instruction corresponding to the texture information deformation value based on the comparison result.

A further aspect provides a method, comprising: detecting an induction region of an electronic device to obtain a first input operation performed by an operation body on press keys of the electronic device, wherein the induction region overlaps with at least a portion of the press keys; collecting and obtaining a first texture information and a second texture information of the operation body within a preset time, and determining a texture information deformation value generated along with the first input operation performed by the operation body based on the first texture information and the second texture information; comparing the texture information deformation value with a preset deformation value to generate a comparison result; and generating and executing a control instruction corresponding to the texture information deformation value based on the comparison result.

The foregoing is a summary and thus may contain simplifications, generalizations, and omissions of details; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Embodiment 1

Figure 1:
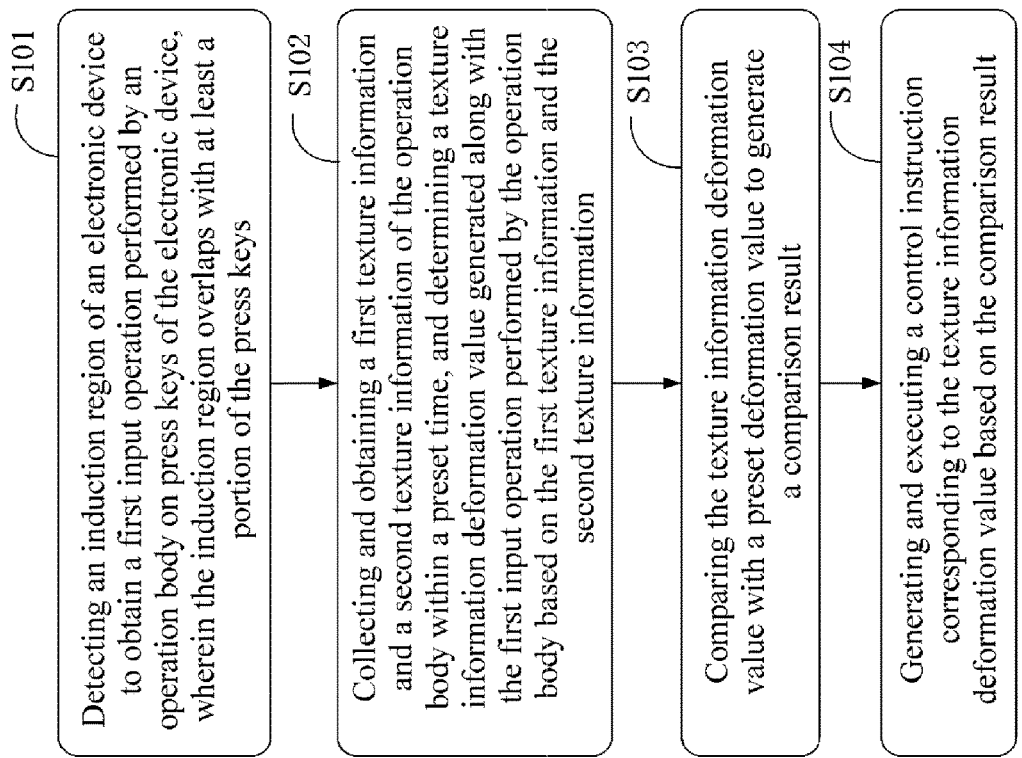
FIG. 1 is a flow chart of an information processing method in accordance with an embodiment.

With reference to FIG. 1, this figure is a flow chart of an information processing method according to Embodiment 1. The method includes, at S101, detecting an induction region of an electronic device to obtain a first input operation performed by an operation body on press keys of the electronic device, wherein the induction region overlaps with at least a portion of the press keys. The method includes, at S102, collecting and obtaining a first texture information and a second texture information of the operation body within a preset time, and determining a texture information deformation value generated along with the first input operation performed by the operation body based on the first texture information and the second texture information. The method includes, at S103, comparing the texture information deformation value with a preset deformation value to generate a comparison result. The method includes, at S104, generating and executing a control instruction corresponding to the texture information deformation value based on the comparison result.

In the specific implementation process, the electronic device may be a smart phone or a tablet computer, or other electronic devices with touch press keys, which are not listed one by one herein. In the embodiments, a smart phone is taken as an example of the electronic device to make detailed description of the method in the embodiments of the present application.

When the method in the embodiments of the present application is adopted to perform information processing, S101 is firstly performed, i.e., detecting an induction region of an electronic device to obtain a first input operation performed by an operation body on press keys of the electronic device, wherein the induction region overlaps with at least a portion of the press keys.

In the specific implementation process, the electronic device is for example a smart phone, the operation body may be a user's finger, and the press key may be a hardware press key on the smart phone, disposed on a region outside of a display screen of the smart phone, such as a main menu button of the smart phone, i.e., a Home button. The electronic device comprises: a processor; a detector module (e.g., a induction recognition device, such as a capacitor plate), coupled to the processor and disposed just below the Home button, located within the housing of the smart phone, the induction region at least overlaps with a portion of the Home button protruding out of the housing, and if the user's phone can be operated by the Home button, the induction recognition device can obtain the position of the touch operation.

In addition, a fingerprint module (e.g., fingerprint chip), coupled to both the processor and the detector module, is further disposed below the induction region, configured to acquire fingerprint information of the user's finger after the capacitor plate detects the touch operation on the Home button of the user's phone. When needing to manipulate the smart phone, the user may use the touch Home button of the phone, and at this time, the Home button of the smart phone detects to obtain input operation of the user's finger on the induction region corresponding to the Home button.

After execution of S101 is completed, the method in the embodiments of the present application has the following two specific implementation manners:

Manner A

After execution of S101 is completed, the method in the embodiments of the present application executes S102, i.e., collecting and obtaining a first texture information and a second texture information of the operation body within a preset time, and determining a texture information deformation value generated along with the first input operation performed by the operation body based on the first texture information and the second texture information.

Figure 2:
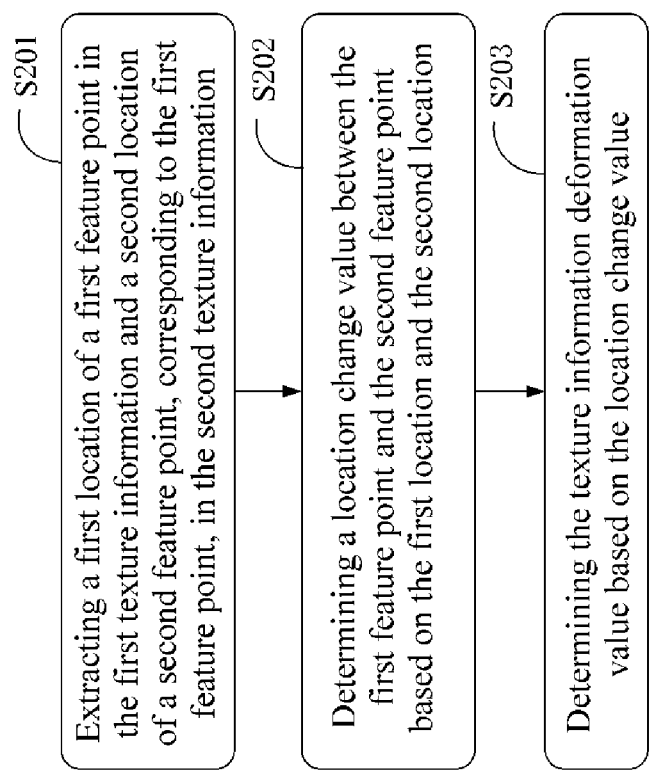
FIG. 2 is a flow chart of a specific implementing manner of step S102 in accordance with an embodiment.

In the embodiments, with reference to FIG. 2, the implementation manner of step S102 is, at S201, extracting a first location of a first feature point in the first texture information and a second location of a second feature point, corresponding to the first feature point, in the second texture information. At S202, determining a location change value between the first feature point and the second feature point based on the first location and the second location. At S203, determining the texture information deformation value based on the location change value.

In the implementation process, in which the above example is still used, when the induction region of the Home button of the smart phone detects the input operation of the user's finger, the fingerprint chip automatically collects a first fingerprint and a second fingerprint of the user's finger. The first fingerprint of the user's finger may be acquired when the user's finger contacts the induction region, and then the second fingerprint may be acquired after a preset time interval, for example, the second fingerprint may be acquired after an interval of 0.2 s. The preset time may be set by the individual user, or may also be set by relevant technicians at the factory, which is not limited in the embodiments.

Figure 3:
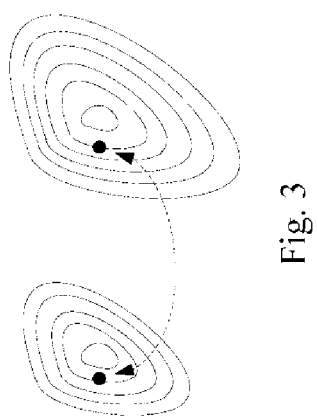
FIG. 3 is a schematic view of a first feature point and a second feature point in accordance with an embodiment.

After the fingerprint chip acquires the first fingerprint and the second fingerprint of the user's finger, location information of the feature point in the fingerprint is extracted. When the first feature point of the first fingerprint may be in a corresponding relation with the second feature point of the second fingerprint, the feature point may specifically be a termination point or a bifurcation point of the fingerprint, or other feature points. If the first feature point is a bump on a second texture in the first fingerprint, the second feature point is the bump on the second texture in the second fingerprint, as shown in FIG. 3. For example, when with respect to the center of the fingerprint the position of the first feature point is 1 mm away from the center of the fingerprint, and the position of second feature point is 1.5 mm away from the center of the fingerprint, calculation is made to obtain that the location change value is 0.5 mm, so as to obtain a texture information deformation value of the first fingerprint and the second fingerprint being 0.5 mm.

Of course, in order to obtain the texture information deformation value more accurately, a manner can also be adopted to obtain multiple pairs of feature points in the first fingerprint and the second fingerprint, respectively calculate the location change value for each pair of the feature points, and calculate an average value thereof, so as to determine the texture information deformation value.

Of course, persons skilled in the art can also adopt other manners to obtain the texture deformation value, such as comparing to obtain a difference between a first surface area corresponding to the feature point in the first fingerprint and a second area corresponding to the feature point in the second fingerprint, which is not limited in the present application.

After the execution of S102 is completed, the method in the embodiments of the present application executes S103, i.e., comparing the texture information deformation value with a preset deformation value to generate a comparison result.

In the specific implementation process, in which the above example is still used, after the smart phone obtains the texture information deformation value of the first fingerprint and the second fingerprint being 0.5 mm, the processor of the smart phone compares the obtained texture information deformation value with the preset deformation value. The preset deformation value specifically may be set by a technician during the implementation of the function, for example, the preset deformation value may be 0.3 mm, 0.5 mm, 0.6 mm, and so on, and is stored in a storage unit of the smart phone. When needed for comparison, the preset deformation value is then read out from the storage unit.

When the preset deformation value is 0.3 mm, because 0.5>0.3, the comparison result that the texture information deformation value is greater than the preset deformation value is generated. When the preset deformation value is 0.5 mm, because 0.5=0.5, the comparison result that the texture information deformation value is equal to the preset deformation value is generated. When the preset deformation value is 0.6 mm, because 0.5<0.6, the comparison result that the texture information deformation value is less than the preset deformation value is generated.

After the execution of S103 is completed, the method in the embodiments of the present application executes S104, i.e., generating and executing a control instruction corresponding to the texture information deformation value based on the comparison result.

Figure 4:
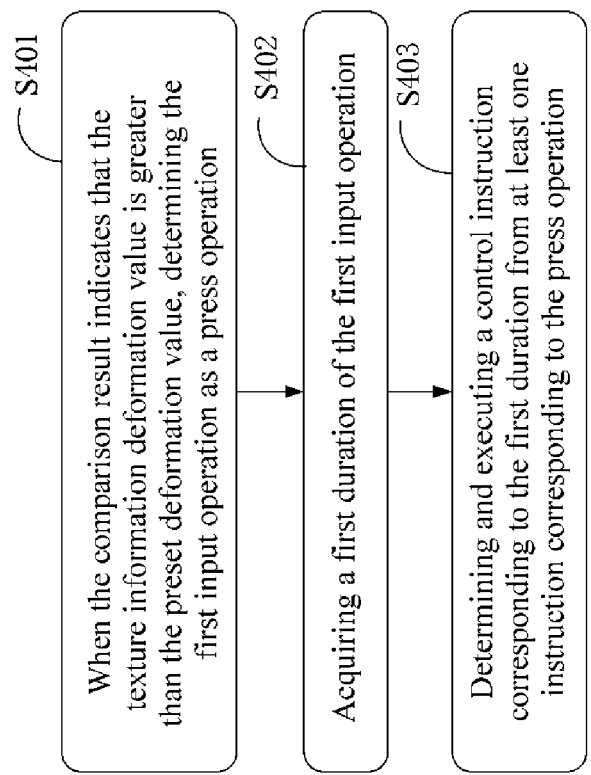
FIG. 4 is a flow chart of a specific implementing manner in the first case of a step S104 in accordance with an embodiment.

In the embodiments of the present application, according to different comparison results, S104 specifically includes the following two cases:

In the first case, with reference to FIG. 4, the specific implementation manner of the S104 is, at S401, when the comparison result indicates that the texture information deformation value is greater than the preset deformation value, determining the first input operation as a press operation. At S402, acquiring a first duration of the first input operation. At S403, determining and executing a control instruction corresponding to the first duration from at least one instruction corresponding to the press operation.

In the specific implementation process, in which the above example is still used, when the processor of the smart phone generates the comparison result that the texture information deformation value is greater than the preset deformation value, the smart phone determines the current input operation of the user's finger as a press operation. The capacitor plate in the induction region then determines the duration of the input operation, and according to the duration of the input operation, a corresponding control instruction is determined from the storage unit of the smart phone.

In the storage unit of the smart phone, more than one control instruction corresponding to the press operation and the duration can be pre-stored, as shown in Table 1. A total duration from the touch of the user's finger on the induction region until the finger leaves the induction region is acquired, and thereby the corresponding control instruction can be determined.

TABLE 1

| Deformation value | Duration | Control instruction |
| --- | --- | --- |
| Greater than N | Less than 0.5 s | Desktop home screen display instruction |
| Greater than N | 0.5-3 s | Voice invoking instruction |
| Greater than N | 3-5 s | Power button function instruction |
| Greater than N | Greater than 5 s | Forced shutdown instruction |

Figure 5:
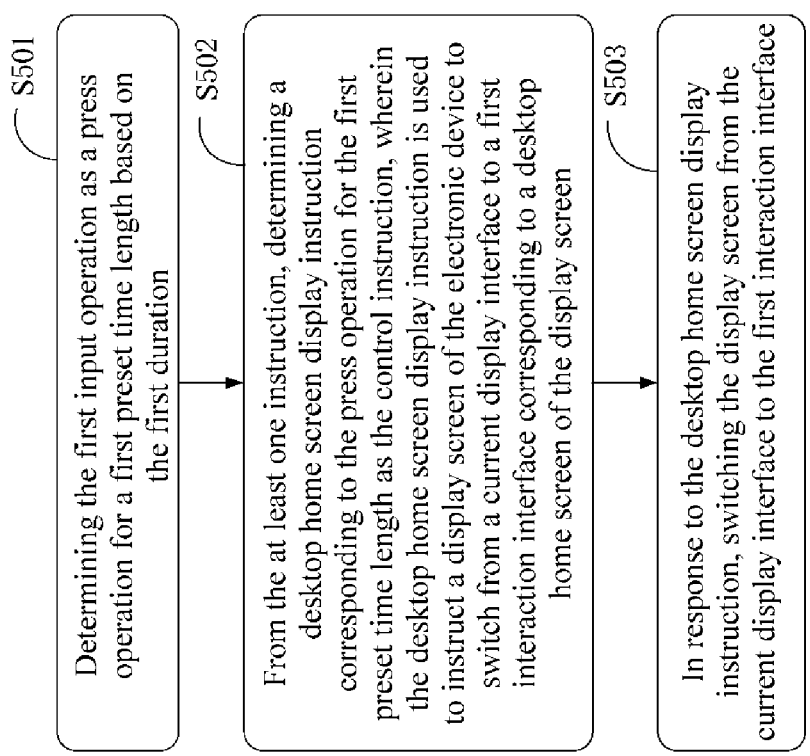
FIG. 5 is a flow chart of a first specific implementing manner of step S403 in accordance with an embodiment.

In the embodiments of the present application, S403 has the following several specific implementation manners. The first manner, with reference to FIG. 5, includes, at S501, determining the first input operation as a press operation for a first preset time length based on the first duration. The first manner includes, at S502, from the at least one instruction, determining a desktop home screen display instruction corresponding to the press operation for the first preset time length as the control instruction, wherein the desktop home screen display instruction is used to instruct a display screen of the electronic device to switch from a current display interface to a first interaction interface corresponding to a desktop home screen of the display screen. The first manner includes, at S503, in response to the desktop home screen display instruction, switching the display screen from the current display interface to the first interaction interface.

In the specific implementation process, in which the above example is still used, the duration of the input operation acquired by the smart phone is 0.3 s, whereby the smart phone determines that the current input operation is a press operation of less than 0.5 s according to a pre-stored press operation instruction table at this time, so as to determine that the current control instruction is an instruction of displaying a desktop home screen. If the current display interface of the smart phone is a chat interface of a QQ application, after the smart phone executes the desktop home screen display instruction, the interface of the desktop home screen is displayed on the display screen.

Figure 6:
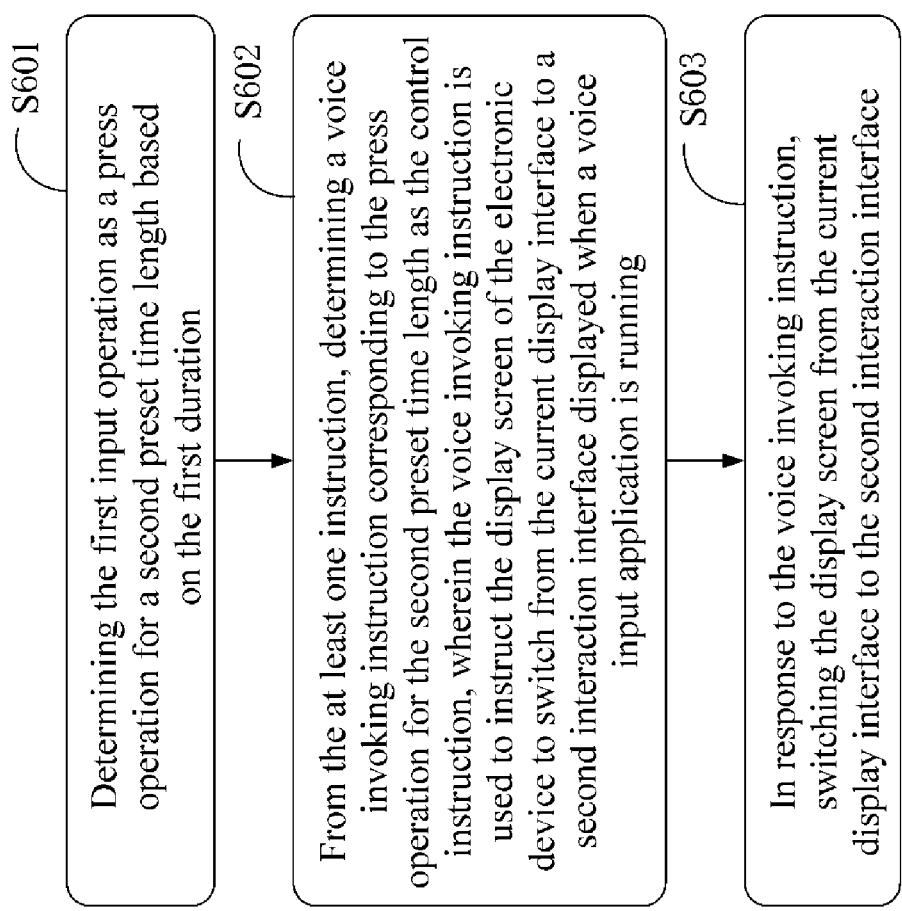
FIG. 6 is a flow chart of a second specific implementing manner of step S403 in accordance with an embodiment.

The second manner, with reference to FIG. 6, includes, at S601, determining the first input operation as a press operation for a second preset time length based on the first duration. The second matter includes, at S602, from the at least one instruction, determining a voice invoking instruction corresponding to the press operation for the second preset time length as the control instruction, wherein the voice invoking instruction is used to instruct the display screen of the electronic device to switch from the current display interface to a second interaction interface displayed when a voice input application is running. The second matter includes, at S603, in response to the voice invoking instruction, switching the display screen from the current display interface to the second interaction interface.

In the specific implementation process, in which the above example is still used, the duration of the input operation acquired by the smart phone is 2 s, so the smart phone determines that the current input operation is a press operation of 0.5-3 s according to a pre-stored press operation instruction table at this time, so as to determine that the current control instruction is a voice invoking instruction. The voice invoking instruction may specifically be an instruction for invoking a voice assistant, and may also be for switching an application such as Wechat or QQ from the keyboard input state to a voice input state, and the smart phone may determine the specific type of the operation according to the current display interface of the display screen. Of course, the voice invoking instruction may also be an instruction used only for invoking a voice assistant, or may be set by persons skilled in the art according to the actual use demand, which is not limited in the embodiments of the present application.

When the instruction for invoking voice assistant is for example taken as the voice invoking instruction, after the smart phone executes the voice invoking instruction, the display screen displays a running interface of a voice assistant application.

Figure 7:
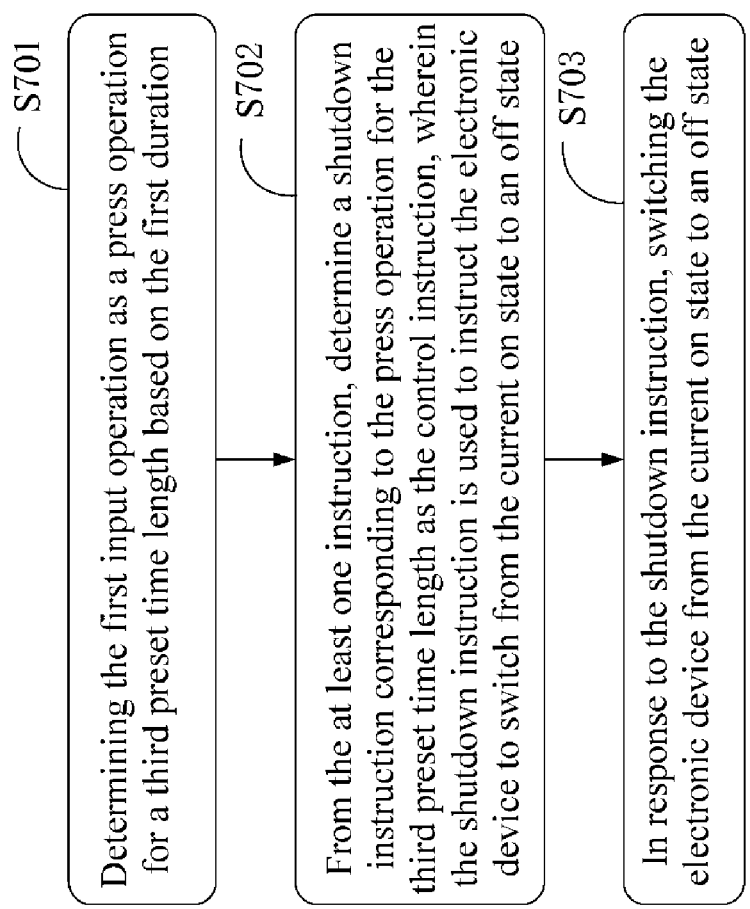
FIG. 7 is a flow chart of a third specific implementing manner of step S403 in accordance with an embodiment.

The third manner, with reference to FIG. 7, includes, at S701, determining the first input operation as a press operation for a third preset time length based on the first duration. The third manner includes, at S702, from the at least one instruction, determining a shutdown instruction corresponding to the press operation for the third preset time length as the control instruction, wherein the shutdown instruction is used to instruct the electronic device to switch from the current on state to an off state. The third matter includes, at S703, in response to the shutdown instruction, switching the electronic device from the current on state to an off state.

In the specific implementation process, in which the above example is still used, the during of the input operation acquired by the smart phone is 6 s, whereby the smart phone determines that the current input operation is a press operation of greater than 5 s according to a pre-stored press operation instruction table at this time, so as to determine that the current control instruction is a shutdown instruction. Then, after executing the shutdown instruction, the smart phone is switched from on state to off state.

In a normal usage process, the power button of a general smart phone also has the functionalities of turning screen on and off. Therefore, in the specific implementation process, an input operation corresponding to the implementation of the functionality of the power button may also be set. As shown in Table 1, when the duration of the input operation is between 3-5 s, the current control instruction is determined as an instruction of implementing the functionality of the power button. Specifically, if the current state of the display screen of the smart phone is a screen on state, after the smart phone executes the instruction of implementing the functionality of the power button, the display screen will be in a screen off state; and if the current state of the display screen of the smart phone is the screen off state, after the smart phone executes the instruction of implementing the functionality of the power button, the display screen will be in the screen on state. Of course, other operations related to the functionality of the power button may also be set by those skilled in the art, which are not limited in the embodiments of the present application.

Figure 8:
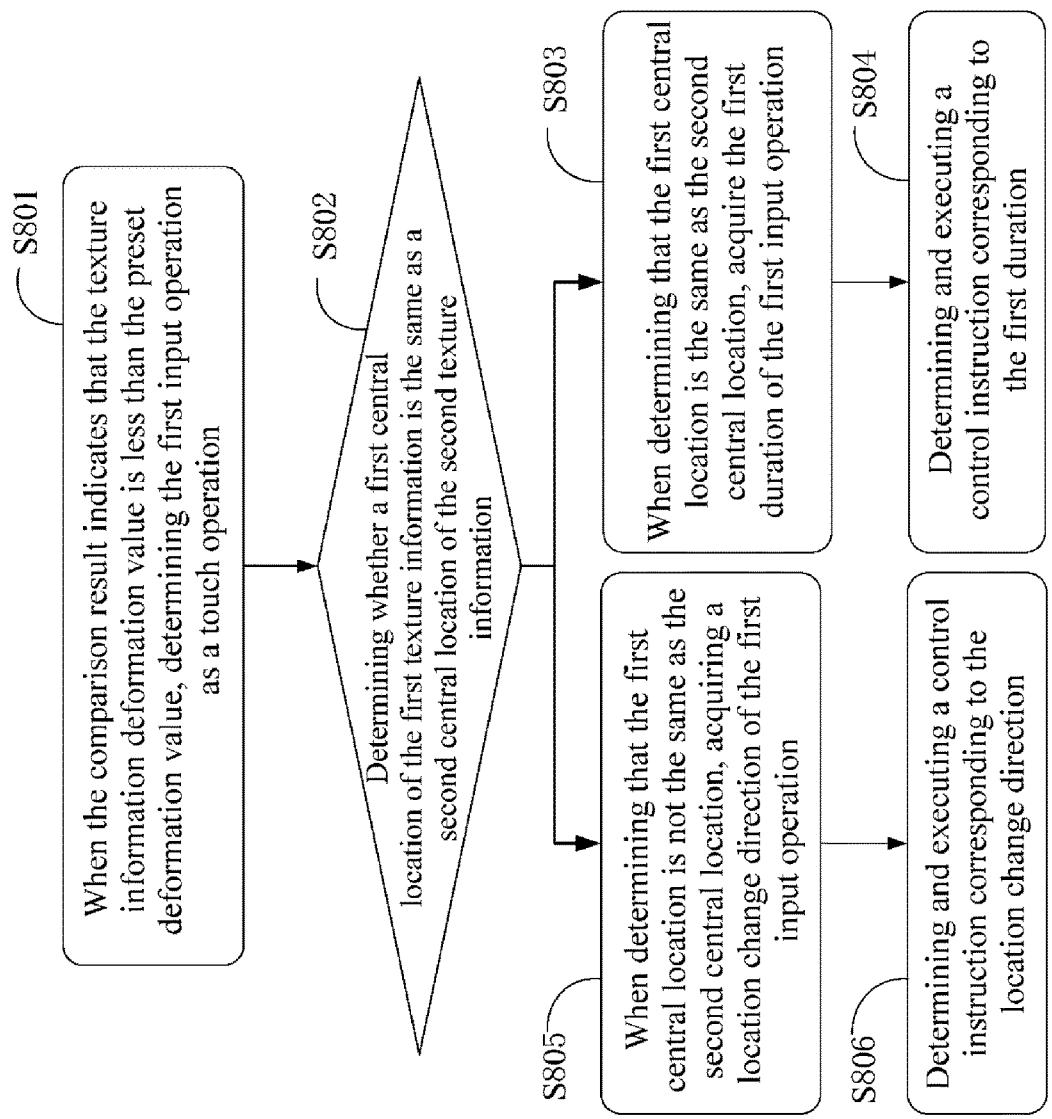
FIG. 8 is a flow chart of a specific implementing manner in the second case of the step S104 in accordance with an embodiment.

In the second case, with reference to FIG. 8, the specific implementation manner of S104 includes, at S801, when the comparison result indicates that the texture information deformation value is less than the preset deformation value, determining the first input operation as a touch operation. The manner includes, at S802, determining whether a first central location of the first texture information is the same as a second central location of the second texture information. The manner includes, at S803, when determining that the first central location is the same as the second central location, acquiring the first duration of the first input operation. The manner includes, at S804, determining and executing a control instruction corresponding to the first duration.

In the embodiments of the present application, after executing S802, S104 further includes, at S805, when determining that the first central location is not the same as the second central location, acquiring a location change direction of the first input operation. S104 further includes, at S806, determining and executing a control instruction corresponding to the location change direction.

In the specific implementation process, in which the above example is still used, when the processor of the smart phone generates the comparison result that the texture information deformation value is less than the preset deformation value, the smart phone determines the current input operation of the user's finger as a touch operation. The control instruction corresponding to the touch operation may be pre-stored in the storage unit of the smart phone, as shown in Table 2. Afterwards, the smart phone is required to determine whether a fingerprint central location of the first fingerprint and a fingerprint central location of the second fingerprint are changed. For example, at a first moment of acquiring the first fingerprint, the coordinate of the central location of acquiring the first fingerprint in the induction region is (40, 30), and at a second moment of acquiring the second fingerprint, the coordinate of the central location of acquiring the second fingerprint in the induction region is (40, 30), in which case the smart phone determines that the positions of the first fingerprint and the second fingerprint are not changed, so as to obtain the duration of the input operation, such as 0.3 s. According to Table 2, the smart phone determines that the current input operation is a touch operation of less than 0.5 s, so as to determine the corresponding control instruction as an instruction for going back to the previous interface. If the current display interface of the display screen is a chat window with a QQ friend A, when the smart phone executes the instruction for going back to the previous interface, the display screen will display a display interface corresponding to a QQ friend list.

TABLE 2

| Deformation value | Duration | Control instruction |
| --- | --- | --- |
| Less than N | Less than 0.5 s | Instruction for going back to the previous interface |
| Less than N | Greater than 0.5 s | Multi-task instruction |
| Less than N | Slide operation | Instruction of switching applications |

When the during of the input operation acquired by the smart phone is 0.6 s, the smart phone determines that the current input operation is a touch operation of greater than 0.5 s according to Table 2, so as to determine that the corresponding control instruction is a multi-task display instruction. After the smart phone responds to the multi-task display instruction, an interface containing at least one application used by the smart phone in the last preset time period will be displayed on the display screen.

When the coordinate of the central location of acquiring the first fingerprint by the smart phone in the induction region is (40, 30), and at a second moment of acquiring the second fingerprint, the coordinate of the central location of acquiring the second fingerprint in the induction region is (20, 30), the smart phone determines that the positions of the first fingerprint and the second fingerprint are changed. The smart phone also determines through the coordinates that the current input operation is an operation of sliding from right to left, and thereby determines the control instruction corresponding to the current operation as the instruction of switching applications according to Table 2. If the current display interface of the display screen is the running interface of a first application, after the smart phone executes the instruction of switching applications, the display screen will display the running interface of a second application.

The second application may be an application which is activated by the smart phone prior to the current moment and which is now running in the background. The smart phone may obtain more than one application that has been activated prior to the current moment and sort the applications running in the background according to a time sequence of switching to a background running status, so as to determine that the last application switched to the background running status at a time point closest to the current moment is the second application to which the smart phone needs to switched. The second application may also be switched by the smart phone according to a preset sorting rule, wherein the preset sorting rule may be set by the user or by the relevant technicians at the factory of the smart phone, which is not limited in the embodiments of the present application.

Manner B

Figure 9:
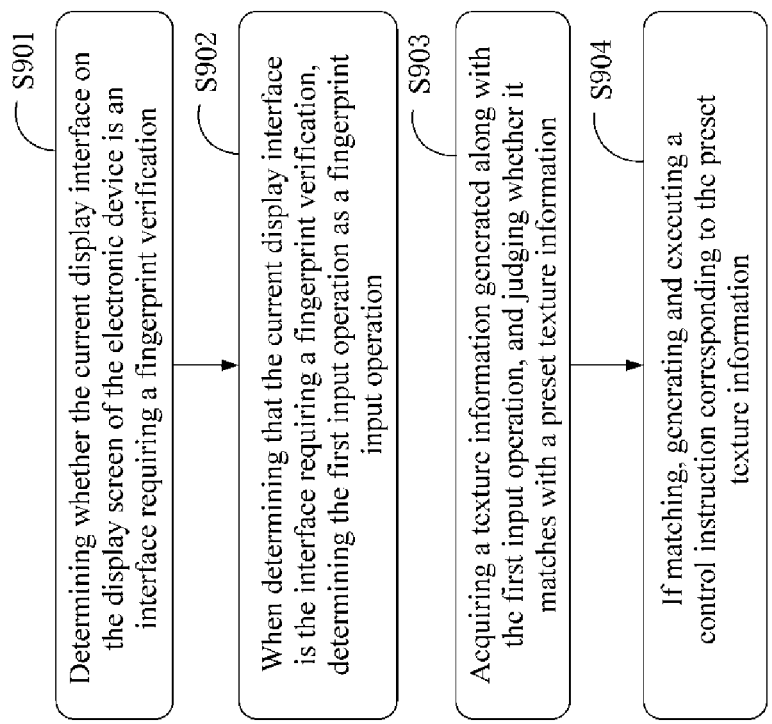
FIG. 9 is a flow chart of a specific implementing manner in the case of Mode B after the completion of a step S101 in accordance with an embodiment.

After the execution of S101 is completed, with reference to FIG. 9, the method in the embodiments of the present application includes, at S901 determining whether the current display interface on the display screen of the electronic device is an interface requiring a fingerprint verification. The method includes, at S902, when determining that the current display interface is an interface requiring a fingerprint verification, determine the first input operation as a fingerprint input operation. The method includes, at S903, acquiring a texture information generated along with the first input operation, and judging whether it matches with a preset texture information. The method includes, at S904, if matching, generating and executing a control instruction corresponding to the preset texture information.

In the specific implementation process, in which the above example is still used, after the input operation of the user's finger is detected in the induction region of the Home button of the smart phone, the processor of the smart phone acquires the current display interface of the smart phone. If the current display interface is a lock interface, because the unlocking manner set by the user is fingerprint unlocking, the smart phone determines that the current display interface is the interface requiring fingerprint verification. In this case, the smart phone determines the input operation performed by the user's finger currently as the fingerprint input operation and the smart phone then automatically collects the fingerprint of the user's finger by means of the fingerprint chip. Specifically, the smart phone may only collect one piece of fingerprint information or may also collect more than one piece of fingerprint information. For example, the first fingerprint of the user's finger is acquired when the user's finger contacts the induction region, and then the second fingerprint is acquired after an interval of a preset time, for example, the second fingerprint is acquired after an interval of 0.2 s. The specific fingerprint collection manners are not limited in the embodiments of the present application.

After the fingerprint chip acquires the fingerprint information of the user's finger, a fingerprint recognition process is performed to extract fingerprint feature information corresponding to the user's finger and match it with pre-stored fingerprint feature information to determine whether the user is a preset user based on the matching result. When the user is determined as the preset user, the corresponding control instruction is generated based on current display interface, such as an unlocking instruction, such that the unlocking process on the smart phone is completed.

In the specific implementation process, when the smart phone determines the corresponding control instruction, the smart phone may also give a feedback to the user by means of controlling the vibration of a linear motor or brightening a breathing light to inform the user of the current operation. Alternatively, the smart phone may also make use of a linear motor once a key value of certain input operation is reached. The linear motor give a simulated feedback of a corresponding physical button operation by means of an allowable maximum acceleration value, thereby improving the user experience.

Embodiment 2

Figure 10:
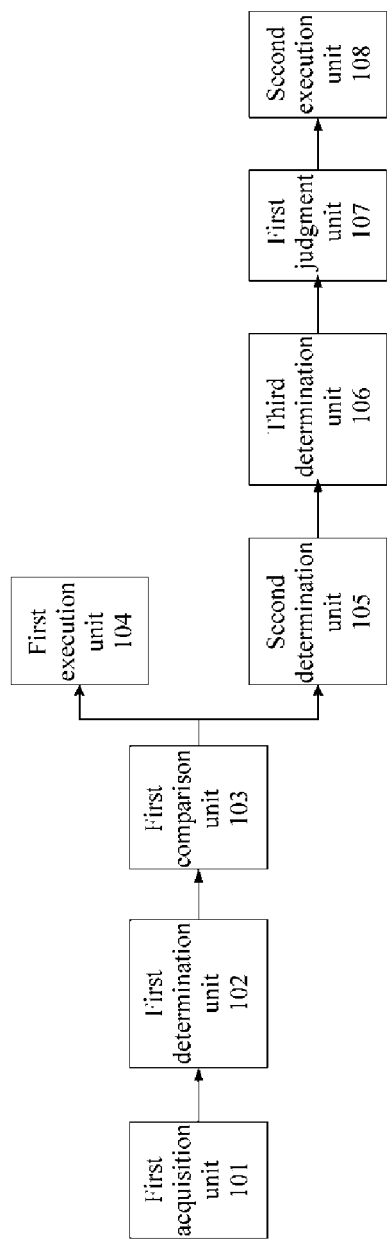
FIG. 10 is a structured block diagram of an electronic device in accordance with an embodiment.

Based on Embodiment 1 of the present application, Embodiment 2 of the present application provides an electronic device, with reference to FIG. 10, which includes a first acquisition unit 101, configured to detect an induction region of an electronic device to obtain a first input operation performed by an operation body on press keys of the electronic device, wherein the induction region overlaps with at least a portion of the press keys. Embodiment 2 includes a first determination unit 102, configured to collect and obtain a first texture information and a second texture information of the operation body within a preset time, and to determine a texture information deformation value generated along with the first input operation performed by the operation body based on the first texture information and the second texture information. Embodiment 2 includes a first comparison unit 103, configured to compare the texture information deformation value with a preset deformation value to generate a comparison result. Embodiment 2 includes a first execution unit 104, configured to generate and execute a control instruction corresponding to the texture information deformation value based on the comparison result.

In Embodiment 2 of the present application, the first determination unit 102 includes a first extracting module, configured to extract a first location of a first feature point in the first texture information and a second location of a second feature point, corresponding to the first feature point, in the second texture information. The first determination unit 102 includes a first determination module, configured to determine a location change value between the first feature point and the second feature point based on the first location and the second location. The first determination unit 102 includes a second determination module, configured to determine the texture information deformation value based on the location change value.

In Embodiment 2 of the present application, the first execution unit 104 includes a third determination module, configured to, when the comparison result indicates that the texture information deformation value is greater than the preset deformation value, determining the first input operation as a press operation. The first execution unit 104 includes a first acquisition module, configured to acquire a first duration of the first input operation. The first execution unit 104 includes a first execution module, configured to, determine and execute a control instruction corresponding to the first duration from at least one instruction corresponding to the press operation.

In Embodiment 2 of the present application, the first execution module includes a first determination sub-module, configured to determine the first input operation as a press operation for a first preset time length based on the first duration. The first execution module includes a second determination sub-module, configured to, from the at least one instruction, determine a desktop home screen display instruction corresponding to the press operation for the first preset time length as the control instruction, wherein the desktop home screen display instruction is used to instruct a display screen of the electronic device to switch from a current display interface to a first interaction interface corresponding to a desktop home screen of the display screen. The first execution module includes a first execution sub-module, configured to, in response to the desktop home screen display instruction, switch the display screen from the current display interface to the first interaction interface.

In Embodiment 2 of the present application, the first execution module includes a third determination sub-module, configured to determine the first input operation as a press operation for a second preset time length based on the first duration. The first execution module includes a fourth determination sub-module, configured to, from the at least one instruction, determine a voice invoking instruction corresponding to the press operation for the second preset time length as the control instruction, wherein the voice invoking instruction is used to instruct the display screen of the electronic device to switch from the current display interface to a second interaction interface displayed when a voice input application is running. The first execution module includes a second execution sub-module, configured to, in response to the voice invoking instruction, switch the display screen from the current display interface to the second interaction interface.

In Embodiment 2 of the present application, the first execution module includes a fifth determination sub-module, configured to determine the first input operation as a press operation for a third preset time length based on the first duration. The first execution module includes a sixth determination sub-module, configured to, from the at least one instruction, determine a shutdown instruction corresponding to the press operation for the third preset time length as the control instruction, wherein the shutdown instruction is used to instruct the electronic device to switch from the current on state to an off state. The first execution module includes a third execution sub-module, configured to, in response to the shutdown instruction, switch the electronic device from the current on state to an off state.

In Embodiment 2 of the present application, first execution unit 104 includes a fourth determination module, configured to, when the comparison result indicates that the texture information deformation value is less than the preset deformation value, determine the first input operation as a touch operation. The first execution unit 104 includes a fifth determination module, configured to determine whether a first central location of the first texture information is the same as a second central location of the second texture information. The first execution unit 104 includes a second acquisition module, configured to, when determining that the first central location is the same as the second central location, acquire the first duration of the first input operation. The first execution unit includes a second execution module, configured to determine and execute a control instruction corresponding to the first duration.

In Embodiment 2 of the present application, first execution unit 104 further includes a third acquisition module, configured to, when determining that the first central location is not the same as the second central location, acquire a location change direction of the first input operation. First execution unit 104 further includes a third execution module, configured to determine and execute a control instruction corresponding to the location change direction.

In Embodiment 2 of the present application, the electronic device further includes a second determination unit 105, configured to determine whether the current display interface on the display screen of the electronic device is an interface requiring a fingerprint verification. The electronic device further includes a third determination unit 106, configured to, when determining that the current display interface is the interface requiring a fingerprint verification, determine the first input operation as a fingerprint input operation. The electronic device further includes a first judgment unit 107, configured to acquire a texture information generated along with the first input operation, and judge whether it matches with a preset texture information. The electronic device further includes a second execution unit 108, configured to, if matching, generate and execute a control instruction corresponding to the preset texture information.

Embodiment 3

Figure 11:
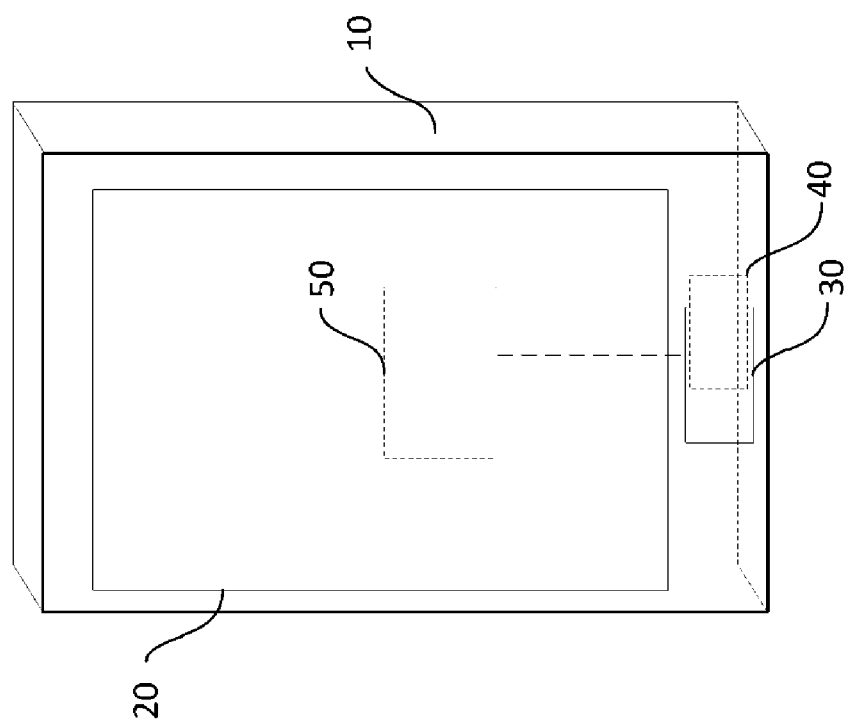
FIG. 11 is a schematic structural view of an electronic device in accordance with an embodiment.

Based on Embodiment 1 of the present application, Embodiment 3 of the present application provides an electronic device, with reference to FIG. 11, including a housing 10. The electronic device includes a display screen 20, disposed within the housing 10, a display area of the display screen 20 being exposed through a first window on a first surface of the housing 10. The electronic device includes press keys 30, disposed on the first surface. The electronic device includes a sensor 40, overlapping with at least a portion of the press keys 30, and configured to detect and obtain a first input operation performed on the press keys 30 by an operation body, and to collect a first texture information and a second texture information of the operation body within a preset time. The electronic device includes a processor 50, connected to the sensor 40, and configured to: determine a texture information deformation value generated along with the first input operation performed by the operation body based on the first texture information and the second texture information; compare the texture information deformation value with a preset deformation value to generate a comparison result; and generate and execute a control instruction corresponding to the texture information deformation value based on the comparison result.

Specifically, the processor 20 may be a general Central Processing Unit (CPU), an Application Specific Integrated Circuit (ASIC), or one or more integrated circuits for controlling the execution of programs.

By providing the sensor 40 on the electronic device, an induction region is formed on the electronic device. The sensor 40 may specifically be a capacitance sensor, a resistance sensor, a fingerprint sensor, or the like, and may also be other sensors, which is not limited in the embodiments of the present application. The induction region specifically includes a touch induction area corresponding to the capacitance sensor or the resistance sensor and a fingerprint induction area corresponding to the fingerprint sensor, wherein the touch induction area is used to detect the operation performed on the press key 30 by the operation body of the electronic device, and the fingerprint induction area is used to acquire the texture information of the operation body.

Further, the electronic device may further include a memory, and the number of the memory may be one or more. The memory may include a Read Only Memory (ROM), a Random Access Memory (RAM), and a disk memory.

In Embodiment 3 of the present application, the processor 50 is specifically configured to extract a first location of a first feature point in the first texture information and a second location of a second feature point, corresponding to the first feature point, in the second texture information. The processor 50 is configured to determine a location change value between the first feature point and the second feature point based on the first location and the second location. The processor 50 is configured to determine the texture information deformation value based on the location change value.

In Embodiment 3 of the present application, the processor 50 is specifically configured to, when the comparison result indicates that the texture information deformation value is greater than the preset deformation value, determine the first input operation as a press operation. The processor 50 is configured to acquire a first duration of the first input operation. The processor 50 is configured to, from at least one instruction corresponding to the press operation, determine and execute a control instruction corresponding to the first duration.

In Embodiment 3 of the present application, the processor 50 is specifically configured to determine the first input operation as a press operation for a first preset time length based on the first duration. The processor 50 is configured to, from the at least one instruction, determine a desktop home screen display instruction corresponding to the press operation for the first preset time length as the control instruction, wherein the desktop home screen display instruction is used to instruct a display screen of the electronic device to switch from a current display interface to a first interaction interface corresponding to a desktop home screen of the display screen. The processor 50 is configured to, in response to the desktop home screen display instruction, switch the display screen from the current display interface to the first interaction interface.

In Embodiment 3 of the present application, the processor 50 is specifically configured to determine the first input operation as a press operation for a second preset time length based on the first duration. The processor 50 is configured to, from the at least one instruction, determine a voice invoking instruction corresponding to the press operation for the second preset time length as the control instruction, wherein the voice invoking instruction is used to instruct the display screen of the electronic device to switch from the current display interface to a second interaction interface displayed when a voice input application is running. The processor 50 is configured to, in response to the voice invoking instruction, switch the display screen from the current display interface to the second interaction interface.

In Embodiment 3 of the present application, the processor 50 is specifically configured to determine the first input operation as a press operation for a third preset time length based on the first duration. The processor 50 is configured to, from the at least one instruction, determine a shutdown instruction corresponding to the press operation for the third preset time length as the control instruction, wherein the shutdown instruction is used to instruct the electronic device to switch from the current on state to an off state. The processor 50 is configured to, in response to the shutdown instruction, switch the electronic device from the current on state to an off state.

In Embodiment 3 of the present application, the processor 50 is specifically configured to, when the comparison result indicates that the texture information deformation value is less than the preset deformation value, determine the first input operation as a touch operation. The processor 50 is configured to determine whether a first central location of the first texture information is the same as a second central location of the second texture information. The processor 50 is configured to, when determining that the first central location is the same as the second central location, acquire the first duration of the first input operation. The processor 50 is configured to determine and execute a control instruction corresponding to the first duration.

In Embodiment 3 of the present application, the processor 50 is specifically configured to, when determining that the first central location is not the same as the second central location, acquire a location change direction of the first input operation. The processor 50 is configured to determine and execute a control instruction corresponding to the location change direction.

In Embodiment 3 of the present application, the processor 50 is further configured to determine whether the current display interface on the display screen of the electronic device is an interface requiring a fingerprint verification. The processor 50 is configured to, when determining that the current display interface is the interface requiring a fingerprint verification, determine the first input operation as a fingerprint input operation. The processor 50 is configured to acquire a texture information generated along with the first input operation, and judge whether it matches with a preset texture information. The processor 50 is configured to, if matching, generate and execute a control instruction corresponding to the preset texture information.

One or more of the technical solutions in the embodiments of the present application can be used to achieve one or more of the following technical effects:

i. The technical solutions in the embodiments adopt the technical means of detecting an induction region of an electronic device to obtain a first input operation performed by an operation body on press keys of the electronic device, wherein the induction region overlaps with at least a portion of the press keys; collecting and obtaining a first texture information and a second texture information of the operation body within a preset time, and determining a texture information deformation value generated along with the first input operation performed by the operation body based on the first texture information and the second texture information; comparing the texture information deformation value with a preset deformation value to generate a comparison result; and generating and executing a control instruction corresponding to the texture information deformation value based on the comparison result, such that the electronic device can generate different control instructions by acquiring different fingerprint deformation amounts of the operation body, and thereby one press key of the electronic device can implement various different functions. Therefore, the technical problem of the electronic device in the prior art that different press keys need to be set to perform different operations and to achieve different functionalities is effectively solved, such that the technical effect of satisfying various functional requirements by using one press key module is achieved.

ii. The technical solutions in the embodiments of the present application adopt the technical means of detecting an induction region of an electronic device to obtain a first input operation performed by an operation body on press keys of the electronic device, wherein the induction region overlaps with at least a portion of the press keys; collecting and obtaining a first texture information and a second texture information of the operation body within a preset time, and determining a texture information deformation value generated along with the first input operation performed by the operation body based on the first texture information and the second texture information; comparing the texture information deformation value with a preset deformation value, to generate a comparison result; and generating and executing a control instruction corresponding to the texture information deformation value based on the comparison result, whereby one press key of the electronic device can implement various different functionalities, such that the electronic device only needs to set one press key, and therefore, the technical effect of reducing the physical space of the electronic device occupied by multiple press keys can be achieved; further, due to the decreased number of the multiple press keys, the number of apertures of the electronic device is also decreased, such that the technical effect of enhancing the overall structural strength of the electronic device is achieved.

As will be appreciated by persons skilled in the art, the embodiments of the present application may be embodied as a method, a system, or a computer program product. Accordingly, the embodiments may take the form of an entirely hardware embodiment, an entirely software embodiment, or an embodiment combining software and hardware aspects. Furthermore, the embodiments may take the form of a computer program product implemented on a computer-usable storage medium (including but not limited to magnetic disk memories, CD-ROMs, optical memories, etc.) containing computer-usable program code. In the context of this document, a storage device is not a signal and "non-transitory" includes all media except signal media.

The embodiments are described with reference to flow charts and/or block diagrams according to the method, device (system), and computer program product according to the embodiments. It should be understood that a computer program instruction may be used to implement each process and/or block in the flow charts and/or block diagrams and combinations of processes and/or blocks in the flow charts and/or block diagrams. The computer program instructions may be provided to a processor of a universal computer, a dedicated computer, or an embedded processor or other programmable data processing device to generate a machine, such that the processor of the computer or other programmable data processing device executes the instruction to generate an apparatus configured to implement functions designated in one or more processes in a flow chart and/or one or more blocks in a block diagram.

The computer program instructions may also be stored in a computer readable storage that can direct a computer or another programmable data processing device to operate in a specific manner, such that the instruction stored in the computer readable storage generates a manufactured product incorporating an instruction apparatus, and the instruction apparatus implements functions designated by one or more processes in a flow chart and/or one or more blocks in a block diagram.

The computer program instructions may also be installed in a computer or another programmable data processing device, such that a series of operation steps are executed on the computer or another programmable device to generate a computer implemented processing, and therefore, the instruction executed in the computer or another programmable device provides steps for implementing functions designated in one or more processes in a flow chart and/or one or more blocks in a block diagram.

Specifically, the computer program instructions corresponding to the information processing method in the embodiments of the present application can be stored on a storage medium such as a CD, a hard disk, and a USB disk, and when the computer program instructions in the storage medium corresponding to the information processing method are read or executed by an electronic device, the following steps include: detecting an induction region of an electronic device to obtain a first input operation performed by an operation body on press keys of the electronic device, wherein the induction region overlaps with at least a portion of the press key. The steps include collecting and obtaining a first texture information and a second texture information of the operation body within a preset time, and determining a texture information deformation value generated along with the first input operation performed by the operation body based on the first texture information and the second texture information. The steps include comparing the texture information deformation value with a preset deformation value to generate a comparison result. The steps include generating and executing a control instruction corresponding to the texture information deformation value based on the comparison result.

Optionally, when the computer program instructions stored in the storage medium corresponding to the step of collecting to obtain first texture information and second texture information of the operation body within a preset time, and determining a texture information deformation value generated along with a first process of the first input operation performed by the operation body based on the first texture information and the second texture information is executed, the following steps include extracting a first location of a first feature point in the first texture information and a second location of a second feature point, corresponding to the first feature point, in the second texture information. The steps include determining a location change value between the first feature point and the second feature point based on the first location and the second location. The steps include determining the texture information deformation value based on the location change value.

Optionally, when the computer program instructions stored in the storage medium corresponding to the step of generating and executing a control instruction corresponding to the texture information deformation value based on the comparison result is executed, the following steps include, when the comparison result indicates that the texture information deformation value is greater than the preset deformation value, determine the first input operation as a press operation. The steps include acquiring a first duration of the first input operation. The steps include determining and executing a control instruction corresponding to the first duration from at least one instruction corresponding to the press operation.

Optionally, when the computer program instructions stored in the storage medium corresponding to the step of executing from at least one instruction corresponding to the press operation, and determining and executing a control instruction corresponding to the first duration is executed, the following steps include determining the first input operation as a press operation for a first preset time length based on the first duration. The steps include, from the at least one instruction, determining a desktop home screen display instruction corresponding to the press operation for the first preset time length as the control instruction, wherein the desktop home screen display instruction is used to instruct a display screen of the electronic device to switch from a current display interface to a first interaction interface corresponding to a desktop home screen of the display screen. The steps include, in response to the desktop home screen display instruction, switching the display screen from the current display interface to the first interaction interface.

Optionally, when the computer program instruction stored in the storage medium corresponds to the step of executing from at least one instruction corresponding to the press operation, and determining and executing a control instruction corresponding to the first duration is executed, the following steps include determining the first input operation as a press operation for a second preset time length based on the first duration. The steps include, from the at least one instruction, determining a voice invoking instruction corresponding to the press operation for the second preset time length as the control instruction, wherein the voice invoking instruction is used to instruct the display screen of the electronic device to switch from the current display interface to a second interaction interface displayed when a voice input application is running. The steps include, in response to the voice invoking instruction, switching the display screen from the current display interface to the second interaction interface.

Optionally, when the computer program instructions stored in the storage medium corresponds to the step of executing from at least one instruction corresponding to the press operation, and determining and executing a control instruction corresponding to the first duration is executed, the following steps include determining the first input operation as a press operation for a third preset time length based on the first duration. The steps include, from the at least one instruction, determining a shutdown instruction corresponding to the press operation for the third preset time length as the control instruction, wherein the shutdown instruction is used to instruct the electronic device to switch from the current on state to an off state. The steps include, in response to the shutdown instruction, switching the electronic device from the current on state to an off state.

Optionally, when the computer program instruction stored in the storage medium corresponding to the step of generating and executing a control instruction corresponding to the texture information deformation value based on the comparison result is executed, the following steps include, when the comparison result indicates that the texture information deformation value is less than the preset deformation value, determining the first input operation as a touch operation. The steps include determining whether a first central location of the first texture information is the same as a second central location of the second texture information. The steps include, when determining that the first central location is the same as the second central location, acquiring the first duration of the first input operation. The steps include determining and executing a control instruction corresponding to the first duration.

Optionally, the storage medium further stores some other computer program instructions, the some other computer program instructions are executed after the execution of the computer program instruction corresponding to the step of determining whether a first central location of the first texture information is the same as a second central location of the second texture information, and the following steps include, when determining that the first central location is not the same as the second central location, acquiring a location change direction of the first input operation. The steps include determining and executing a control instruction corresponding to the location change direction.

Optionally, the storage medium further stores some other computer program instructions, the some other computer program instructions are executed after the execution of the computer program instruction corresponding to the step of detecting an induction region of an electronic device to obtain a first input operation performed by an operation body on press keys of the electronic device, and the following steps include determining whether the current display interface on the display screen of the electronic device is an interface requiring a fingerprint verification. The steps include, when determining that the current display interface is the interface requiring a fingerprint verification, determine the first input operation as a fingerprint input operation. The steps include acquiring a texture information generated along with the first input operation, and judging whether it matches with a preset texture information. The steps include, if matching, generating and executing a control instruction corresponding to the preset texture information.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An electronic device, comprising:
    a processor;
    a fingerprint module operatively coupled to the processor, wherein the fingerprint module acquires fingerprint information of a user;
    a detector module operatively coupled to the processor and the fingerprint module, wherein the detector module detects a change in the fingerprint information as the fingerprint information is being acquired by the fingerprint module, wherein the change in the fingerprint information corresponds to a change in distance between a feature point and a reference point of a fingerprint as the fingerprint information is being acquired; and
    an execution unit configured to generate and execute a control instruction corresponding to the change in the fingerprint information, wherein the control instruction corresponds to at least one of:
        a press operation when the change is greater than a preset deformation value; and
        a touch operation when the change is less than the preset deformation value.

2. The electronic device of claim 1, wherein:
    the detector module determines a duration of a contact between a finger of the user and the fingerprint module; and
    the processor causes the different operations of the electronic device to be performed depending upon the duration of the contact between the finger of the user and the fingerprint module.

3. An electronic device, comprising:
a first acquisition unit, configured to detect an induction region of an electronic device to obtain a first input operation performed by an operation body on press keys of the electronic device, wherein the induction region overlaps with at least a portion of the press keys;
a first determination unit, configured to collect and obtain a first texture information and a second texture information of the operation body within a preset time, and determine a texture information deformation value generated along with the first input operation performed by the operation body based on the first texture information and the second texture information, wherein the texture information deformation value is associated with a change in distance between a feature point and a reference point of the operation body from the first texture information to the second texture information;
a first comparison unit, configured to compare the texture information deformation value with a preset deformation value to generate a comparison result; and
a first execution unit, configured to generate and execute a control instruction corresponding to the texture information deformation value based on the comparison result, wherein the control instruction corresponds to at least one of:
a press operation when the comparison result indicates that the texture information deformation value is greater than the preset deformation value; and
a touch operation when the comparison result indicates that the texture information deformation value is less than the preset deformation value.

4. The electronic device of claim 3, further comprising:
a housing;
a display screen, disposed within the housing, a display area of the display screen being exposed through a first window on a first surface of the housing;
press keys, disposed on the first surface;
a sensor, overlapping with at least a portion of the press keys, configured to detect and obtain a first input operation performed on the press keys by an operation body and collect the first texture information and the second texture information of the operation body within a preset time; and
a processor; and
a memory storing instructions executable by the processor to:
determine the texture information deformation value generated along with the first input operation performed by the operation body based on the first texture information and the second texture information;
compare the texture information deformation value with a preset deformation value to generate a comparison result; and
generate and execute a control instruction corresponding to the texture information deformation value based on the comparison result.

5. The electronic device of claim 4, wherein the instructions are further executable by the processor to:
extract a first location of a first feature point in the first texture information and a second location of a second feature point, corresponding to the first feature point, in the second texture information;
determine a location change value between the first feature point and the second feature point based on the first location and the second location; and
determine the texture information deformation value based on the location change value.

6. The electronic device of claim 5, wherein the instructions are further executable by the processor to:
determine the first input operation as a press operation when the comparison result indicates that the texture information deformation value is greater than the preset deformation value;
acquire a first duration of the first input operation; and
determine and execute a control instruction corresponding to the first duration from at least one instruction corresponding to the press operation.

7. The electronic device of claim 6, wherein the instructions are further executable by the processor to:
determine the first input operation as a press operation for a first preset time length based on the first duration;
determine a desktop home screen display instruction corresponding to the press operation for the first preset time length as the control instruction from the at least one instruction, wherein the desktop home screen display instruction is used to instruct a display screen of the electronic device to switch from a current display interface to a first interaction interface corresponding to a desktop home screen of the display screen; and
switch the display screen from the current display interface to the first interaction interface in response to the desktop home screen display instruction.

8. The electronic device of claim 6, wherein the instructions are further executable by the processor to:
determine the first input operation as a press operation for a second preset time length based on the first duration;
determine a voice invoking instruction corresponding to the press operation for the second preset time length as the control instruction from the at least one instruction, wherein the voice invoking instruction is used to instruct the display screen of the electronic device to switch from the current display interface to a second interaction interface displayed when a voice input application is running; and
switch the display screen from the current display interface to the second interaction interface in response to the voice invoking instruction.

9. The electronic device of claim 6, wherein the instructions are further executable by the processor to:
determine the first input operation as a press operation for a third preset time length based on the first duration;
determine a shutdown instruction corresponding to the press operation for the third preset time length as the control instruction from the at least one instruction, wherein the shutdown instruction is used to instruct the electronic device to switch from the current on state to an off state; and
switch the electronic device from the current on state to an off state in response to the shutdown instruction.

10. The electronic device of claim 5, wherein the instructions are further executable by the processor to:
determine the first input operation as a touch operation when the comparison result indicates that the texture information deformation value is less than the preset deformation value;
determine whether a first central location of the first texture information is the same as a second central location of the second texture information;
acquire the first duration of the first input operation when determining that the first central location is the same as the second central location; and determine and execute a control instruction corresponding to the first duration.

11. The electronic device of claim 10, wherein the instructions are further executable by the processor to:
acquire a location change direction of the first input operation when determining that the first central location is not the same as the second central location; and
determine and execute a control instruction corresponding to the location change direction.

12. The electronic device of claim 4, wherein the instructions are further executable by the processor to:
determine whether the current display interface on the display screen of the electronic device is an interface requiring a fingerprint verification;
determine the first input operation as a fingerprint input operation when determining that the current display interface is the interface requiring a fingerprint verification;
acquire, using the sensor, a texture information generated along with the first input operation,
judge whether the texture information matches with a preset texture information; and
generate and execute a control instruction corresponding to the preset texture information if the texture information matches with the preset texture information.

13. A method, comprising:
detecting an induction region of an electronic device to obtain a first input operation performed by an operation body on press keys of the electronic device, wherein the induction region overlaps with at least a portion of the press keys;
collecting and obtaining a first texture information and a second texture information of the operation body within a preset time, and determining a texture information deformation value generated along with the first input operation performed by the operation body based on the first texture information and the second texture information, wherein the texture information deformation value is associated with a change in distance between a feature point and a reference point of the operation body from the first texture information to the second texture information;
comparing the texture information deformation value with a preset deformation value to generate a comparison result;
generating and executing a control instruction corresponding to the texture information deformation value based on the comparison result, wherein the control instruction corresponds to at least one of:
a press operation when the comparison result indicates that the texture information deformation value is greater than the preset deformation value; and
a touch operation when the comparison result indicates that the texture information deformation value is less than the preset deformation value.

14. The method of claim 13, wherein the collecting and obtaining comprises:
extracting a first location of a first feature point in the first texture information and a second location of a second feature point, corresponding to the first feature point, in the second texture information;
determining a location change value between the first feature point and the second feature point based on the first location and the second location; and
determining the texture information deformation value based on the location change value.

15. The method of claim 14, wherein the generating and executing comprises:
determining the first input operation as a press operation when the comparison result indicates that the texture information deformation value is greater than the preset deformation value;
acquiring a first duration of the first input operation; and
determining and executing a control instruction corresponding to the first duration from at least one instruction corresponding to the press operation.

16. The method of claim 15, wherein the determining and executing of a control instruction corresponding to the first duration from at least one instruction corresponding to the press operation comprises:
determining the first input operation as a press operation for a first preset time length based on the first duration;
determining a desktop home screen display instruction corresponding to the press operation for the first preset time length as the control instruction from the at least one instruction, wherein the desktop home screen display instruction is used to instruct a display screen of the electronic device to switch from a current display interface to a first interaction interface corresponding to a desktop home screen of the display screen; and
switching the display screen from the current display interface to the first interaction interface in response to the desktop home screen display instruction.

17. The method of claim 15, wherein the determining and executing of a control instruction corresponding to the first duration from at least one instruction corresponding to the press operation comprises:
determining the first input operation as a press operation for a second preset time length based on the first duration;
determining a voice invoking instruction corresponding to the press operation for the second preset time length as the control instruction from the at least one instruction, wherein the voice invoking instruction is used to instruct the display screen of the electronic device to switch from the current display interface to a second interaction interface displayed when a voice input application is running; and
switching the display screen from the current display interface to the second interaction interface in response to the voice invoking instruction.

18. The method of claim 15, wherein the determining and executing of a control instruction corresponding to the first duration from at least one instruction corresponding to the press operation comprises:
determining the first input operation as a press operation for a third preset time length based on the first duration;
determining a shutdown instruction corresponding to the press operation for the third preset time length as the control instruction from the at least one instruction, wherein the shutdown instruction is used to instruct the electronic device to switch from the current on state to an off state; and
switching the electronic device from the current on state to an off state in response to the shutdown instruction.

19. The method of claim 14, wherein the generating and executing of a control instruction corresponding to the texture information deformation value based on the comparison result comprises:
determining the first input operation as a touch operation when the comparison result indicates that the texture information deformation value is less than the preset deformation value;

determining whether a first central location of the first texture information is the same as a second central location of the second texture information;

acquiring the first duration of the first input operation when determining that the first central location is the same as the second central location; and determining and executing a control instruction corresponding to the first duration.

20. The method of claim 13, further comprising:

determining whether the current display interface on the display screen of the electronic device is an interface requiring a fingerprint verification;

determining the first input operation as a fingerprint input operation when determining that the current display interface is the interface requiring a fingerprint verification;

acquiring a texture information generated along with the first input operation and judging whether it matches with a preset texture information; and generating and executing a control instruction corresponding to the preset texture information if the texture information matches with the preset texture information.

\* \* \* \* \*